(12) United States Patent
Rautenbach et al.

(10) Patent No.: US 8,597,933 B2
(45) Date of Patent: Dec. 3, 2013

(54) METHOD OF TREATING A SULPHIDE MINERAL

(75) Inventors: George Frederick Rautenbach, Johannesburg (ZA); Carol Susan Davis-Belmar, Johannesburg (ZA); Cecilia Susana Demergasso, Johannesburg (ZA)

(73) Assignee: BHP Billiton SA Limited, Johannesburg (ZA)

( * ) Notice: Subject to any disclaimer, the term of this patent is extended or adjusted under 35 U.S.C. 154(b) by 272 days.

(21) Appl. No.: 13/000,824

(22) PCT Filed: Jun. 25, 2009

(86) PCT No.: PCT/ZA2009/000060
§ 371 (c)(1),
(2), (4) Date: Apr. 26, 2011

(87) PCT Pub. No.: WO2010/009481
PCT Pub. Date: Jan. 21, 2010

(65) Prior Publication Data
US 2011/0201095 A1 Aug. 18, 2011

(30) Foreign Application Priority Data

Jun. 29, 2008 (ZA) .................................. 2008/04653
Apr. 14, 2009 (ZA) .................................. 2009/02517

(51) Int. Cl.
C02F 3/34 (2006.01)
C12N 1/20 (2006.01)

(52) U.S. Cl.
USPC .................... 435/262; 435/252.1; 435/252.4; 435/822

(58) Field of Classification Search
None
See application file for complete search history.

(56) References Cited

FOREIGN PATENT DOCUMENTS

WO WO 02/081761 10/2002

OTHER PUBLICATIONS

Kinnunen et al. "Chloride-promoted leaching of chalcopyrite concentrate by biologically produced ferric sulfate". Journal of Chemical technology and Biotechnology, 2004, 79: 830-834.*
Rawlings D., E. et al., "Biomineralization of metal-containing ores and concentrates", Trends in Biotechnology, Elsevier Publications, Cambridge, GB, vol. 21, No. 1, dated Jan. 1, 2003, pp. 38-44, XP004397635 ISSN: 0167-7799 the whole document.
Okibe N. et al., "Biooxidation of Pyrite by Defined Mixed Cultures of Moderately Thermophilic Acidophiles in ph-Controlled Bioreactors: Significance of Microbial Interactions", Biotechnology and Bioengineering, John Wiley and Sons Inc., U.S., vol. 87, No. 5, Sep. 5, 2004, pp. 574-583, XP002549279, pp. 576-582.
Demergasso et al., "Molecular Characterization of Microbial Populations in a Low-Grade Copper Ore Bioleaching Test Heap", Hydrometallurgy, Elsevier Scientific Publishing Cy., Amsterdam, NL, vol. 80, No. 4, Dec. 30, 2005, pp. 241-253, XP005182651, ISSN: 0304-386X abstract.
Qiu Guan Zhou et al., "Isolation of a Strain of *Acidithiobacillus caldus* and Its Role in Bioleaching of Chalcopyrite", World Journal of Microbiology and Biotechnology, Kluwer Academic Publishers, DO, vol. 23, No. 9, Feb. 6, 2007, pp. 1217-1225, XP019535138; ISSN: 1573-0972 abstract.
Ojumu T.V. et. al., "The effect of dissolved cations on microbial ferrous-iron oxidation by *Leptospirillum ferriphilum* in continuous culture", Hydrometallurgy, Elsevier Scientific Publishing Cy., Amsterdam, NL, vol. 94, No. 1-4, Nov. 1, 2008, pp. 69-76, XP025507894; ISSN: 0304-386X; [retrieved on Jun. 3, 2008]; Available online Mar. 6, 2008; the whole document.

* cited by examiner

*Primary Examiner* — Vera Afremova
(74) *Attorney, Agent, or Firm* — Brinks Gilson & Lione; G. Peter Nichols

(57) ABSTRACT

A copper bioleaching process which makes use of a consortium which contains *Leptospirillum ferriphilum* and a sulphur oxidising microorganism which is halophilic or halotolerant.

10 Claims, 7 Drawing Sheets

>*Leptospirillum ferriphilum* strain *Sp-Cl* partial 16S rDNA sequence (SEQ ID NO:1)
```
taacacatgcaagtccgacgtgaaaggggagcaatcccccggtagggtggcaaacggggtgagtaagacatggggtgatcta
ccctggagatggggatatccctccgaaagggggggcaataccgaatagagtccggttccgtgaagggggaccggggaaagg
gaggcctctggaacaagcttccgctcctggatgagcccatgccctatcagctagttggtaggtaaaggcctaccaaggc
gacgacgggtagctggtctgagaggacaaccagccacactggcactgagacacggggccagactcctacgggaggcagcag
tgaggaatattgcgcaatgggggcaaccctgacgcagcaacgccgcgtgtgggaagaaggctttcgggttgtaaaccact
tttgcccgggacgaaaaggggcgtcagaatacggcgcttcgatgacggtaccgggagaataagccacggctaactctgtg
ccagcagccgcggtaagacagaggtggcaagcgttgttcggagtaactgggcgtaaagagtctgtaggtggtttgtcaag
tctttggtgaaaggccgtggcttaaccatgggaatgccaaagagactggcagactggaggctgggagagggaagcggaat
ttctggtgtagcggtggaatgcgtagatatcagaaggaggcccggtggcgaaggcggcttccttggacaggcctgacac
tgagacgaaaacgtgggagcaaacaggattagataccctggtagtccacgccctaaacgatgggtactaagtgtggga
gggttaaacctcccgtgccgcagccaacgcagtaagtacccccgcctggggagtacggccgcaaggttgaaactcaaagga
attgacgggggccccgcacaagcggtggtgcatgtggtttaattcgacgcaacgcgaagaaccttacctgggcttgacata
ccgcgagtagggaactgaaaggggaccgaccggttcagtccggaagcggaacaggtgctgcatggctgtcgtcagctcgt
gccgtgaggtgtgggttcagtccgcaacgagcgcaacctcgcctctgttgccacaggggtcatgccgggcactctga
ggggactgccagcgacaagttgaggaaggagaggatgacgtcaagtcatcatgccccttatgcccagggcccacacacgt
gcaacaatggccggtacagacggatgcgagaccgagaggtggagcaaatccgagaaagccggtcccagttcggattgagg
tctgcaactcgacctcatgaagtcggaatcgctagtaattcggcgaattctggcattcaat
```

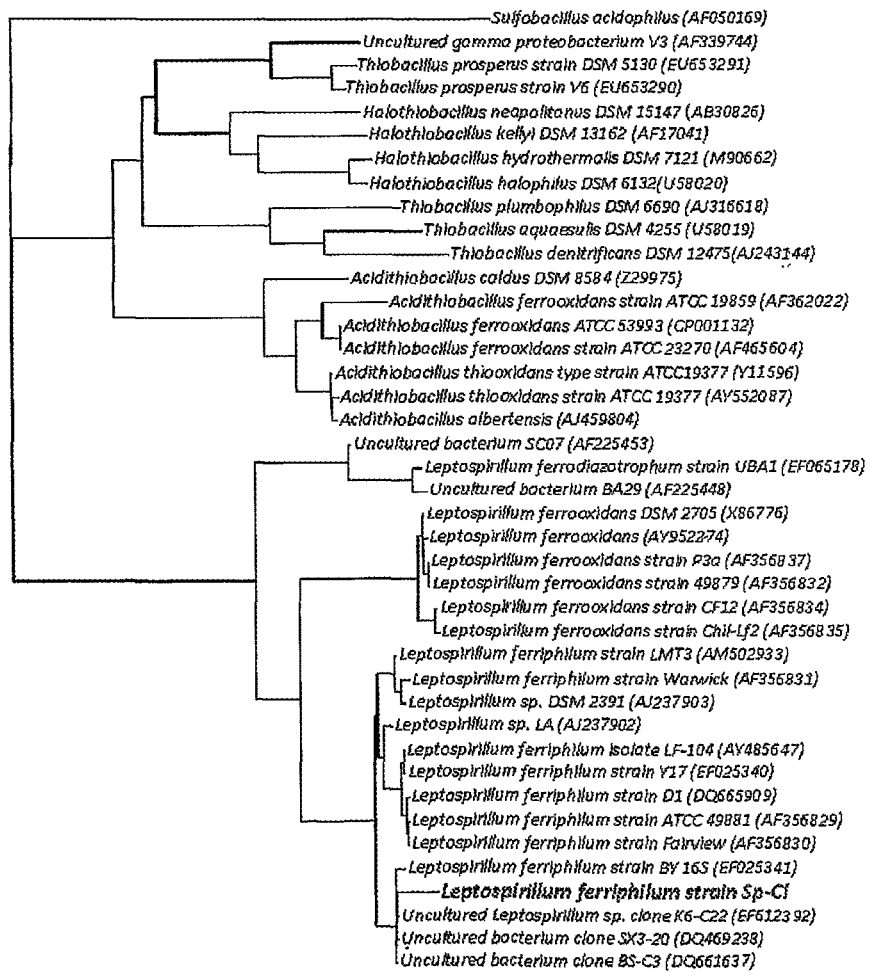

FIGURE 1

SEQUENCE LISTING

```
<160> NUMBER OF SEQ ID NOS: 1

<210> SEQ ID NO 1
<211> LENGTH: 1341
<212> TYPE: DNA
<213> ORGANISM: Leptospirillum ferriphilum strain Sp-Cl

<400> SEQUENCE: 1
taacacatgc aagtccgacg tgaaagggga gcaatccccc ggtagggtgg caaacgggtg      60
agtaagacat gggtgatcta ccctggagat ggggatatcc ctccgaaagg gggggcaata     120
ccgaatagag tccggttccg tgaaggggac cggggaaagg gaggcctctg gaacaagctt     180
ccgctcctgg atgagcccat ggcccatcag ctagttggta gggtaaaggc ctaccaaggc     240
gacgacgggt agctggtctg agaggacaac cagccacact ggcactgaga cacgggccag     300
actcctacgg gaggcagcag tgaggaatat tgcgcaatgg gggcaaccct gacgcagcaa     360
cgccgcgtgt gggaagaagg ctttcgggtt gtaaaccact tttgcccggg acgaaaaggg     420
gcgtcagaat acgcgcttc gatgacggta ccgggagaat aagccacggc taactctgtg     480
ccagcagccg cggtaagaca gaggtggcaa gcgttgttcg gagtaactgg gcgtaaagag     540
tctgtaggtg gtttgtcaag tctttggtga aaggccgtgg cttaaccatg gaatgccaa      600 agagactggc agactggagg ctgggagagg gaagcggaat ttctggtgta gcggtggaat     660
gcgtagatat cagaagggag gccggtggc gaaggcggct tccttggaca ggcctgacac      720
tgagagacga aagcgtggga gcaaacagga ttagataccc tggtagtcca cgccctaaac     780
gatgggtact aagtgtggga gggttaaacc tcccgtgccg cagccaacgc agtaagtacc     840
```

-continued

```
ccgcctgggg agtacggccg caaggttgaa actcaaagga attgacgggg gcccgcacaa    900
gcggtggtgc atgtggttta attcgacgca acgcgaagaa ccttacctgg gcttgacata    960
ccgcgagtag ggaactgaaa ggggaccgac cggttcagtc cggaagcgga acaggtgctg   1020
catggctgtc gtcagctcgt gccgtgaggt gttgggttca gtcccgcaac gagcgcaacc   1080
ctcgccctct gttgccaccg ggtcatgccg ggcactctga ggggactgcc agcgacaagt   1140
tggaggaagg agaggatgac gtcaagtcat catggccctt atgcccaggg ccacacacgt   1200
gcaacaatgg ccggtacaga cggatgcgag accgagaggt ggagcaaatc cgagaaagcc   1260
ggtcccagtt cggattgagg tctgcaactc gacctcatga agtcggaatc gctagtaatt   1320
cggcgaattc tggcattcaa t                                             1341
```

METHOD OF TREATING A SULPHIDE MINERAL

This application claims priority to PCT Application Serial. No. PCT/ZA2009/000060 filed Jun. 25, 2009 published in English on Jan. 21, 2010 as PCT WO 2010/009481; and to South African Application No. 2008/04653 filed Jun. 29, 2008 and also South African Application No. 2009/02517 filed Apr. 14, 2009, the entire contents of each are incorporated herein by reference.

BACKGROUND OF THE INVENTION

This invention relates to a method of treating a sulphide mineral or a mixed sulphide and oxide mineral for the recovery of metal content. The invention is described hereinafter with particular reference to the recovery of copper. This is exemplary only, and not limiting, for principles of the invention can be used for the recovery of other base metals such as nickel from nickel sulphide minerals e.g. pentlandite and millerite, and zinc from zinc sulphide minerals.

US 2008/0026450 describes a method of recovering copper from copper sulphide ores containing chalcopyrite in which leaching is carried out by means of a chloride ion-resistant sulphur oxidising bacterium in a leaching solution which has a chloride ion concentration of from 6 g/l to 18 g/l and a pH in the range 1.6 to 2.5.

It is suggested that, with this method, the copper leaching rate is promoted by adjusting the chloride ion concentration of the leaching solution. Further, as sulphur is converted to sulphuric acid it becomes possible to prevent a significant reduction in the leaching rate which is otherwise caused by sulphur coating surfaces of the copper sulphide ore.

A similar approach to the aforegoing but restricted to the use of a specific microorganism, is disclosed in US2007/0202584.

An aspect on which the aforementioned patent applications are silent, and which is largely ignored in the prior art, is that the presence of free copper in the form of $Cu^2$ is generally toxic to microorganisms which are used in bioleaching processes. The toxic effect of copper on bioleaching related organisms is especially severe in the presence of chloride ions. This reduces the efficiency of metal recovery.

AU 2002254782 describes a method of bioleaching a sulphide mineral in a solution with a chloride content in excess of 5000 ppm and at a temperature in excess of 10° C. using at least one bacterium selected from those deposited under the accession numbers DSM14175 and DSM14174.

Despite this disclosure the limited tolerance to salt of the bacteria means that in many instances large volumes of fresh water are still required in bioleaching mineral processing operations. Also, at relatively low temperatures, e.g. up to 45° C., the leaching of chalcopyrite is generally inefficient.

The invention is concerned with a bioleaching method which exhibits increased efficiency and which can be implemented under high chloride ion content conditions.

SUMMARY OF INVENTION

The invention, in one aspect, is based on the surprising discovery that the use of a consortium of iron oxidising and sulphur oxidising halophilic or halotolerant microorganisms have what is believed to be a communalistic relationship which improves the bioleaching process. For reasons which are not fully understood at present it appears that the microorganisms in the consortium participate in a symbiotic relationship in which one microorganism derives some benefit while the other microorganism, or microorganisms, as the case may be, are largely unaffected. In practice this translates into improved bioleaching efficiency under defined particular conditions.

In particular the invention provides a method of treating a sulphide mineral or mixed sulphide and oxide mineral which includes the step of bioleaching the mineral in a chloride ion solution with a mixed culture consortium and which is characterised in that:
a) the chloride ion content is in the range 1500 ppm to 30000 ppm;
b) the solution contains at least one of the following: aluminium, magnesium and sodium;
c) the temperature of the solution is in excess of 10° C.;
d) the pH of the solution is in the range 1 to 3; and
e) the mixed culture consortium contains, at least, a strain of *Leptospirillum ferriphilum*, and a sulphur oxidising microorganism which is halophilic or halotolerant.

The chloride ion content may lie in the range of 5000 ppm to 30000 ppm.

When the method is applied to a heap leaching process the temperature of the solution in the heap may lie in the range of 10° C. to 60° C. or even higher. Typically the temperature is in the range of 25° C. to 45° C.

The consortium may be inoculated into the heap in any appropriate way. In one form of the invention the consortium is added by means of irrigation.

At least one microorganism included in the consortium may be cultured in one or more build-up reactors. Use may for example be made of a plurality of reactors each of which is used for inoculum build-up of a respective microorganism which is active in a particular range.

Inoculation may take place on a batch (discontinuous) basis or on a continuous basis.

When inoculation takes place on a continuous basis the inoculant, derived from the consortium, may have a cell concentration of from $10^6$ cells/ml to $10^{10}$ cells/ml. Typically the cell concentration is between $10^7$ cells/ml and $10^9$ cells/ml.

The build-up reactors may be operated at a site which is close to the heap. Air may be sparged into each reactor and the air may be supplemented with carbon dioxide. The carbon dioxide supplementation may be in the range of 0.1% to 5% v/v.

The inoculation may be carried out to maintain the cell count in the heap at a value of from $10^6$ to $10^{11}$ cells per ton of ore.

In a variation of the invention an inoculum from each reactor, instead of going directly from the reactor to the heap, is directed to a pond which is aerated and in which the inoculum is stored and maintained. Inoculum from the pond is then added to the heap as necessary.

In a second variation of the invention the inoculum, for example from one or more build-up reactors, is added to crushed ore together with acid as may be required and the inoculated ore is added to the heap as necessary.

In another form of the invention a heap which is relatively small compared to the main heap is operated in a closed circuit configuration. Inoculum from one or more build-up reactors or from the inoculum pond referred to is used to irrigate the small heap. Leach solution draining from the small heap is re-circulated to the small heap which thus acts as an inoculum generator. Ore from the small heap, onto which active microorganisms have attached themselves, is added to the main heap to introduce the active microorganisms to the main heap.

In a variation of the invention an intermediate leach solution, i.e. a solution which is extracted from the heap and which is not subjected to a metal recovery process, and raffinate produced by passing a pregnant leach solution draining from the heap through a metal recovery process, are re-circulated to the heap to increase the active cell count in the heap. The intermediate solution may have a cell count of from $10^4$ cells/ml to $10^8$ cells/ml. The raffinate may have a similar cell count. Acid may be added to the raffinate as required. The heap may be sparged with air supplemented with carbon dioxide e.g. 0.03 to 2.0 $CO_2$ v/v, and preferably about 0.1 $CO_2$ v/v.

The invention lends itself to the recovery of a base metal such as copper, nickel or zinc from sulphide or mixed sulphide and oxide ores which contain the metal. In the case, particularly, of copper it has been observed that certain microorganisms have only a limited tolerance to even relatively low levels of free copper in solution. Consequently, as copper is leached into solution by microbiological action, the leaching process becomes self-limiting.

Under the aforementioned conditions the invention is preferably further characterised in that the microorganisms have a tolerance to copper in excess of 0.5 g/l. An upper limit of copper tolerance is at least 6 g/l but, preferably, the microorganisms are tolerant to copper concentrations as high as 20 g/l.

The method of the invention may also be applied to a tank leaching process. In this instance the bioleaching may take place at a temperature in the range 25° C. to 55° C. and, depending on the microorganisms in the consortium, typically at a temperature in the range 30° C. to 45° C.

The tank may include an agitator.

The consortium may be inoculated directly into the tank or it may be added to the chloride solution. The chloride solution may be added to or mixed with a concentrate of the mineral which is then supplied to the tank.

At least one of the microorganisms included in the mixed culture consortium may be adapted for the purpose to increase tolerance of the consortium to chloride and to copper.

The mixed culture consortium may include, at least, the following microorganisms: a chloride tolerant or halophilic sulphur oxidising bacterium (e.g. *Acidithiobacillus* or *Thiobacillus* sp.) and *Leptospirillum ferriphilum* Sp-Cl.

The applicant has determined that the strain Sp-Cl which is acidophilic and chloride resistant is suitable for the bioleaching of sulphide minerals in high soluble chloride and metal environments. The organism was isolated from a pregnant leach solution of the Minera Spence S. A. mine in the Antofagasta region of Chile. The organism *Leptospirillum ferriphilum* strain Sp-Cl was deposited as a pure culture in the Deutsche Sammlung von Mikroorganismen and Zellkulturen GmbH (DSMZ) under the accession number DSM 22399 on 2 Mar. 2009. Strain Sp-Cl is an autotrophic and chemolithotropic iron oxidizing bacterium with the capability of growth in ferrous iron as a sole energy source in the absence of reduced sulphur compounds at high soluble chloride and metal concentrations.

Strain Sp-Cl oxidizes iron in a pure or in a mixed culture with an acidophilic chloride resistant or halophilic sulphur oxidizing bacterium.

Kinnunen and Puhakka [2004] evaluated the chloride tolerance of what was stated to be a *Leptospirillum ferriphilum* dominated mixed culture. The authors reported iron oxidation rates significantly reduced at [Cl⁻] of 10 g/l and complete inhibition at 20 g/l, compared to the iron oxidation rate obtained in the absence of chloride ions. However, the paper provides no evidence to support a *Leptospirillum ferriphilum* species dominating the mixed culture or to indicate whether a *Leptospirillum ferriphilum* strain is actually responsible for catalyzing the iron oxidation results reported in the presence of chloride ions. Furthermore, no reference was made to iron oxidation rates nor to microbial inhibition in the presence of chloride and soluble copper.

The only autotrophic, acidophilic, chloride-tolerant, iron oxidizing strains described to date, of which the applicant is aware, belong to the genus of *Thiobacillus*, specifically to the species group of "prosperus"—*Thiobacillus prosperus* [Huber and Stetter, 1989]. These organisms have an inherent requirement of chloride for their optimal growth (halophilic). The *Thiobacillus* prosperus group (type strain, strain V6, and other strains present as mixed cultures) [Huber and Stetter, 1989; Simmons and Norris, 2004; Norris 2007; Davis-Belmar et al, 2008] are acidophilic, iron-oxidizing and sulphur-oxidizing halotolerant bacteria capable of growth up to [Cl⁻] of 28 g/l on ferrous iron (with tetrathionate) and up to [Cl⁻] of 36 g/l in the presence of pyrite as a mixed culture with sulphur oxidizing acidithiobacilli [Simmons and Norris, 2004]. These organisms require the supplementation of a reduced sulphur compound, specifically tested on only tetrathionate, for good growth on ferrous iron as the sole energy source [Davis-Belmar et al, 2008; Simmons and Norris, 2002]. No tolerance levels nor high resistance to metals applicable to bioleaching, specifically to copper concentrations above 1 $g/l^{-1}$, or other impurities (e.g. aluminium), have been reported for these organisms [Davis-Belmar et al, 2008].

Bacteria belonging to the *Thiobacillus/Halothiobacillus*, *Thioalkalimicrobium* and *Thiomicrospira* genera [Kelly & Wood, 2000; Sorokin et al, 2001] are closest phylogenetically related to the *Thiobacillus* prosperus group and not to the *Acidithiobacillus* species (required reclassification from the *Thiobacillus* genus). In contrast to the *Thiobacillus* prosperus-like strains, these chemolithotropic organisms oxidize inorganic sulphur compounds under saline alkaline conditions and can thus not thrive under acidic conditions nor utilize ferrous iron as a sole energy source.

BRIEF DESCRIPTION OF THE DRAWINGS

The invention is further described by way of examples with reference to the accompanying drawings in which:

FIG. 1 presents the partial 16S rDNA sequence and a phylogenetic analysis based on the algorithm of the neighbour-joining method and the evolutionary distance, indicated as nucleotide substitutions per base pair (scale bar);

DESCRIPTION OF PREFERRED EMBODIMENTS

Based on the 16S rDNA phylogeny (FIG. 1) the Sp-Cl strain belongs to the *Leptospirillum* genus, species *ferriphilum* (*Leptospirillum* group II). The 16S rDNA sequence3 clusters within a distinct subgroup of *Leptospirillum* group II with no known cultivated representatives.

The isolated Sp-Cl strain, termed *Leptospirillum ferriphilum* Sp-Cl, was deposited as a pure culture in the Deutsche Sammlung von Mikroorganismen and Zellkulturen GmbH (DSMZ) under the accession number DSM 22399 on 2 Mar. 2009.

Figure 2:
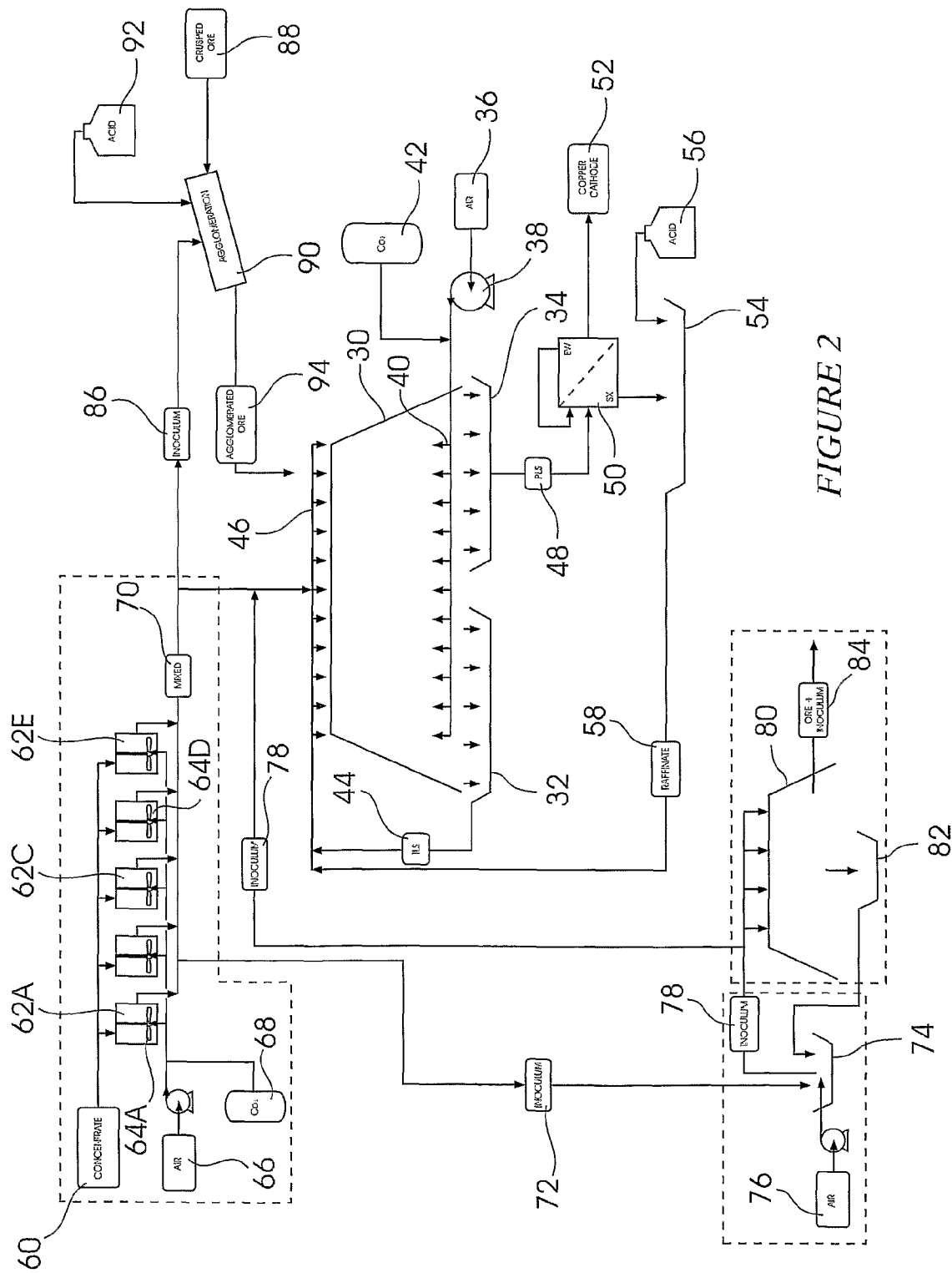
FIG. 2 is a block diagram representation of a heap leaching bioprocess, with possible variations thereto, conducted in accordance with the principles of the invention.

FIG. 2 illustrates a heap leaching process implemented with the consortium referred to. A heap 30 is constructed from agglomerated ore on pads 32 and 34 using conventional techniques. Air 36 is sparged via a fan 38 into a manifold 40 in a lower region of the heap. Carbon dioxide from a source 42 is added at a controlled rate, typically 0.1% $CO_2$ v/v, to the air stream.

An intermediate heap solution 44 collected in the pad 32 is optionally re-circulated to an irrigation system 46 positioned above the heap. Pregnant leach solution 48 collected in the pad 34 is subjected to a solvent extraction/electrowinning process 50 to recover the copper content of the pregnant leach solution on cathodes 52.

Table 1 lists as an example some chemical species in pregnant leach solution from a heap bioleach process containing chloride ions, with the predominant cations in the leach circuit being aluminium, magnesium, sodium, iron and copper.

TABLE 1

ICP analysis on leach solution from a heap bioleach process.

| Element | | PLS ICP |
|---|---|---|
| Chloride | g/l | 7.09 |
| Sulphate | g/l | 28.38 |
| Zinc | mg/l | 25 |
| Arsenic | mg/l | 3.88 |
| Aluminium | g/l | 1.36 |
| Cadmium | mg/l | 0.7 |
| Calcium | mg/l | 456 |
| Barium | ppb | 30 |
| Magnesium | mg/l | 822 |
| Strontium | mg/l | 1.2 |
| Sodium | g/l | 3.08 |
| Tin | ppb | 50 |
| Potassium | mg/l | 209 |

TABLE 1-continued

ICP analysis on leach solution from a heap bioleach process.

| Element | | PLS ICP |
|---|---|---|
| Vanadium | mg/l | 1.59 |
| Iron | mg/l | 799 |
| Lithium | mg/l | 15 |
| Cobalt | mg/l | 3.61 |
| Copper | g/l | 5.05 |
| Nickel | mg/l | 0.98 |
| Manganese | mg/l | 25 |

Raffinate from the process 50 is collected in a pond 54 and supplemented with sulphuric acid 56, as necessary. At least part of the raffinate 58 which has a cell concentration of $10^4$ to $10^8$ cells/ml is recycled to the irrigation system 46.

Use can be made of one or more techniques to ensure that an adequate volume of the consortium, with an acceptable cell count, is available.

A first possibility is to make use of at least one build-up reactor in which the consortium is cultivated. In this technique a concentrate 60 is introduced to a plurality of inoculum build-up reactors 62A to 62E in which cultivation of the consortium takes place. The reactors can operate at different temperatures, as appropriate, to achieve optimum propagation of the consortium. Each reactor can be agitated as appropriate by means of a respective impeller 64A to 64E. Air 66 is directed into a lower region of each reactor and carbon dioxide 68 is added to the air to maximise and control the inoculum build-up in each reactor. The carbon dioxide is present in the range 0.1% to 5% v/v.

Inoculum 70 is drawn from each reactor, as required, to inoculate the heap. The inoculum can be added at regular intervals on a batch basis but preferably is added at a controlled and continuous rate. The cell concentration of the inoculum depends on the functioning of each reactor and on any dilution which may take place but typically lies in the range of from $10^7$ to $10^{10}$ cells/ml with a preferred value being in the range of $10^7$ to $10^9$ cells/ml. An objective in this regard is to keep the cell count in the heap in the range of from $10^6$ to $10^{12}$ cells/ton of ore.

In another approach inoculum 72 from one or more of the reactors is directed to an inoculum pond 74 which is aerated (76). The pond is a storage and maintenance pond and, as required, inoculum 78, typically with a cell concentration of from $10^5$ to $10^8$ cells/ml, is directed to the irrigation system.

In another variation the inoculum 78, either from the pond or any of the reactors, is directed into a small separate heap 80 which is operated under closed circuit conditions. Solution draining from the heap is collected in a pond 82 and either is directly re-circulated to the heap or is stored and maintained in the inoculation pond 74. Ore 84 which contains the inoculum is separated from the heap 80 and is then agglomerated with the ore in the heap 30 to help maintain the population of the consortium in the heap at an appropriate level.

It is also possible to direct the raffinate 58 and the intermediate leach solution 44, or a mixture thereof, to the irrigation system to maintain the cell count in the heap.

In a different approach shown at the top right hand side of FIG. 2 the inoculum 86 from one or more of the reactors 68 is used to inoculate crushed ore 88 which is agglomerated in a process 90. Sulphuric acid 92 is added to the ore and the inoculated and agglomerated ore 94 is introduced into the heap 30 as required.

Figure 3:
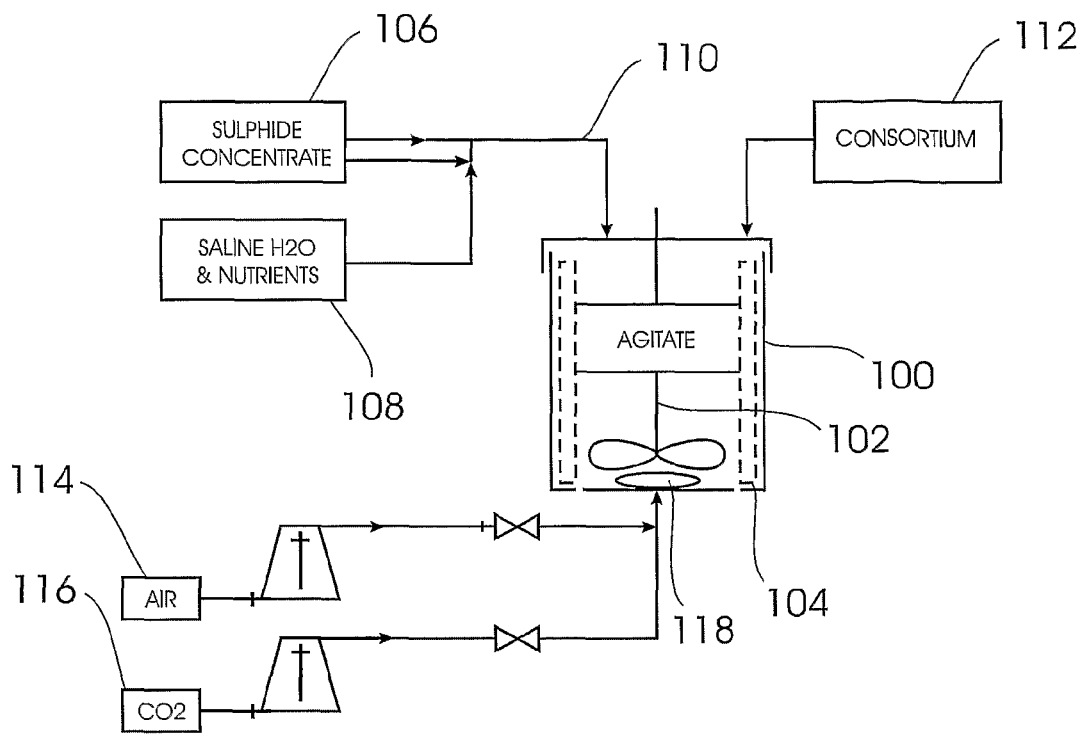
FIG. 3 is a schematic representation of a tank bioleaching process conducted in accordance with the principles of the invention.
Figure 4:
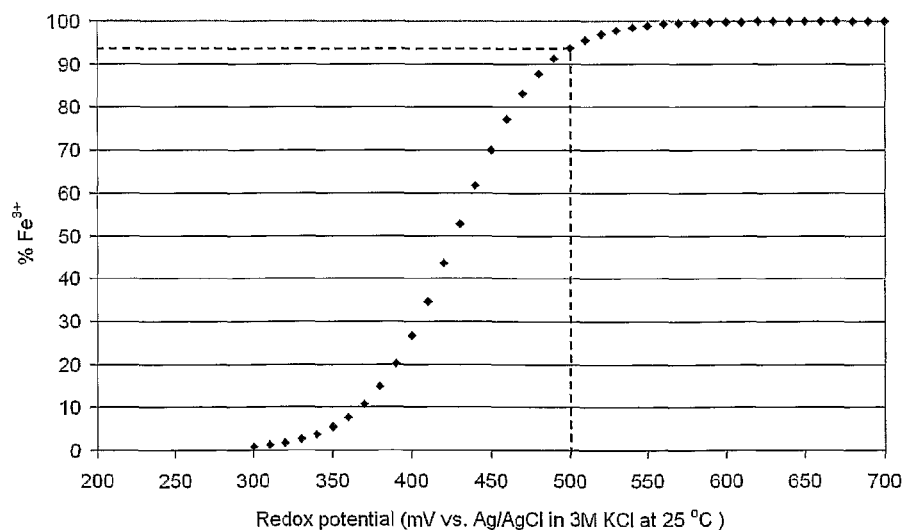
FIG. 4 is a graphical illustration of the Nernst equation demonstrating the relationship of percentage oxidized iron ($Fe^{3+}$) and solution potential (millivolts versus Ag/AgCl/3M KCl reference cell at 25° C.)

FIG. 3 depicts the use of the consortium in a tank leaching application. A reactor 100 is equipped with an agitator 102 and an air sparging ring 104. A solution of the sulphide concentrate 106 to be leached is introduced into the tank in a controlled manner. A saline solution 108 which contains nutrients is added either to a feed line 110 extending from the concentrate source to the tank or directly to the concentrate 106. A solution 112 containing the consortium, prepared off-site, is introduced into the solution in the tank, as appropriate, to achieve a desired cell count. Air 114 and carbon dioxide 116 are sparged into the tank through a sparging system 118 in a low region of the tank, as is necessary.

Mineral treatment steps carried out prior to the bioleaching phase and subsequently thereto to recover the metal content from the leach solution are not shown for these aspects are known in the art.

Figure 5:
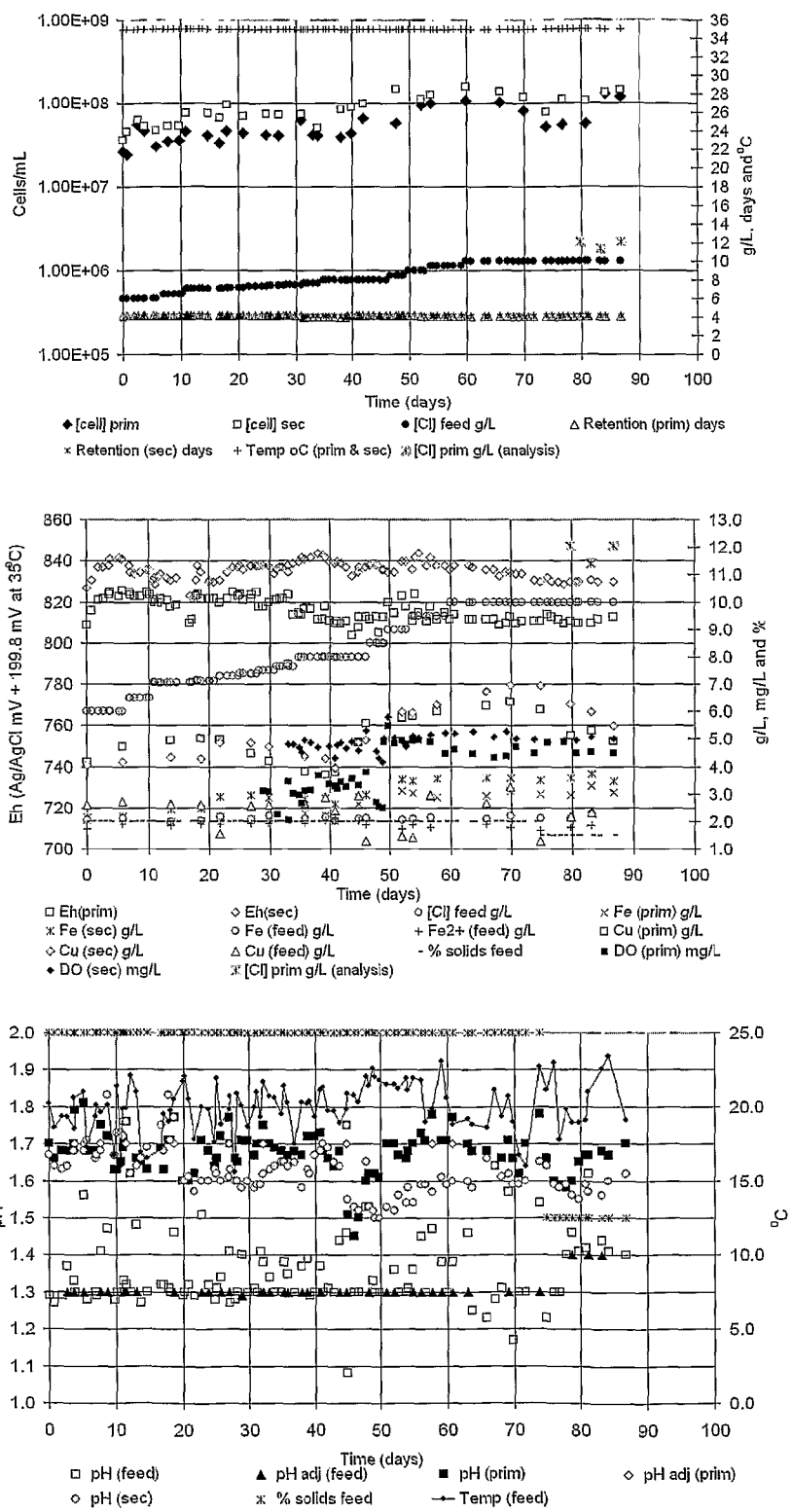
FIG. 5 has three graphs which present operating parameters and physical/chemical conditions of a continuous copper concentrate fed bioreactor system (feed tank, primary and secondary bioreactor) employed for the growth of a mixed consortium used as an inoculum in the method of the invention.

FIG. 5 demonstrates the capability of growing the consortium in a reactor-based system, referred to in FIG. 2, to a cell concentration of between $10^7$ to $10^9$ cells/ml at 10-12 g/l $Cl^-$ and a copper ion concentration exceeding 5 g/l at an approximate 4 day reactor retention time, furthermore maintaining a redox potential of above 600 mV (Ag/AgCl) in the primary and secondary reactors. The primary and secondary reactors were maintained at a temperature of approximately 35° C. and a pH, including the feed tank, of between 1 and 2. A copper sulphide concentrate was treated in the reactor system and served as the main source of reported soluble copper values.

Figure 6:
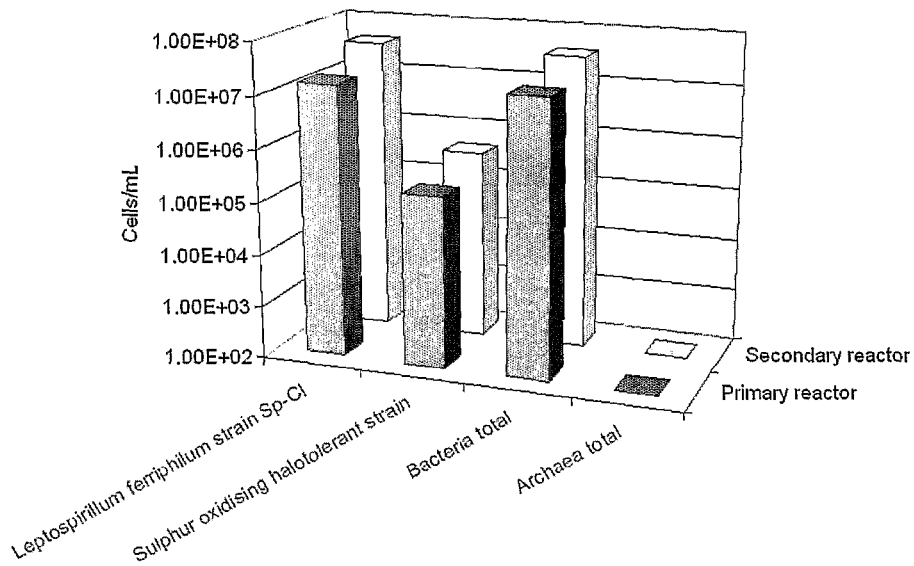
FIG. 6 illustrates results of Real-Time PCR analysis performed on the consortium grown in the bioreactor system of FIG. 5.

FIG. 6 illustrates the results of Real-Time PCR analyses conducted on the consortium used in the method of the invention to establish the cell concentration in a sample of a bioleaching solution. The cell concentration of the consortium results from the respective concentrations of the strains which are included in the consortium, namely *Leptospirillum ferriphilum* strain Sp-Cl and a sulphur oxidising strain.

Figure 7:
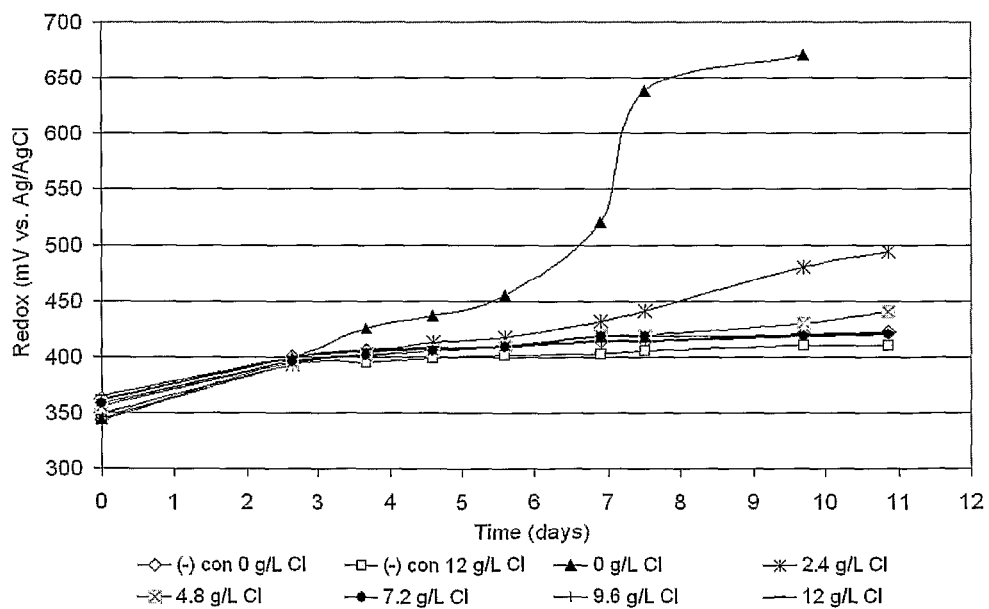
FIG. 7 demonstrates the iron oxidation capability of a bioleach mesophile culture over a chloride concentration range of 0-12 g/l in culture media containing 3 g/l ferrous iron.
Figure 8:
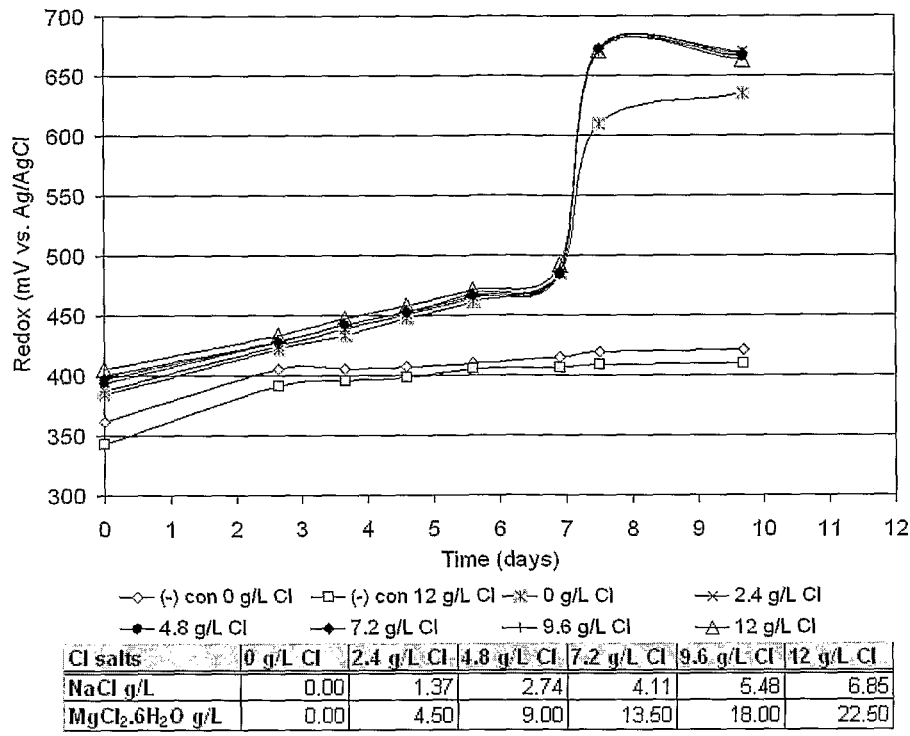
FIG. 8 shows the iron oxidisation capability of the *Leptospirillum ferriphilum* strain Sp-Cl over a chloride concentration range of 0-12 g/l in culture media containing 3 g/l ferrous iron.

FIGS. 7 and 8 show results of shake flask tests that were carried out to compare the iron oxidation capability of a normal mesophile culture obtained from a copper concentrate bioreactor with the pur culture of *Leptospirillum ferriphilum* strain Sp-Cl at different concentrations of a mix of sodium chloride and magnesium chloride and 1 g/l $Cl^-$. The normal bioleach culture showed severe inhibition between 0 and 2.4 g/l $Cl^{-1}$, with no activity observed at the chloride ion concentrations tested above 4.8 g/l (FIG. 7) over an 11 day growth period. The *Leptospirillum ferriphilum* strain Sp-Cl showed no inhibition (complete iron oxidation in less than 8 days) between 0 and 12 g/l $Cl^{-1}$.

Figure 9:
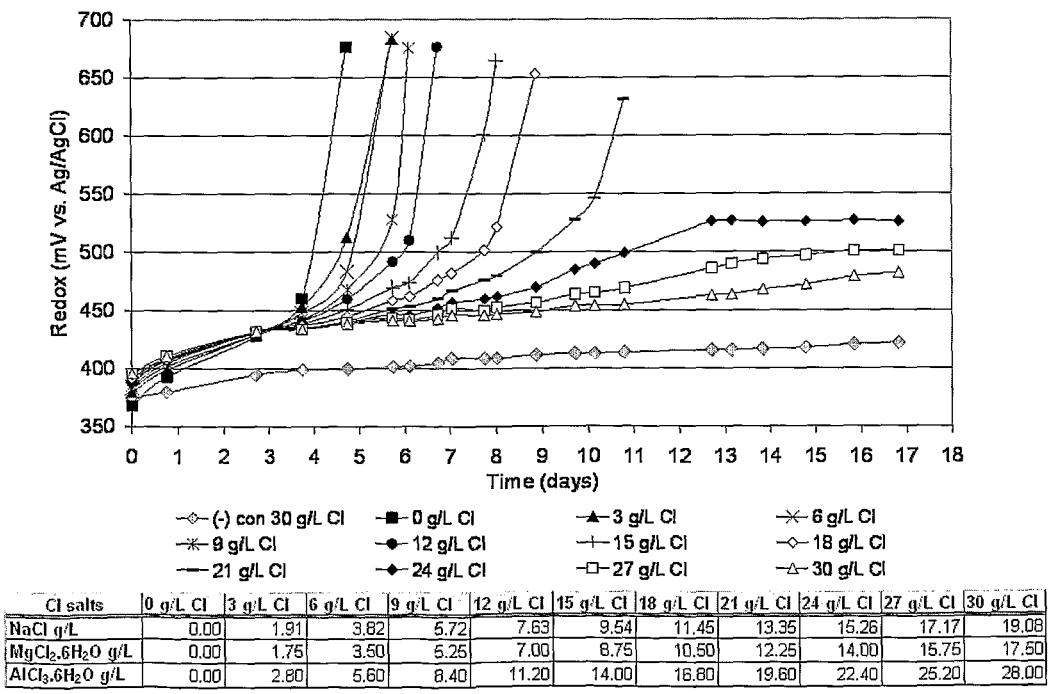
FIG. 9 presents the iron oxidisation capability of the *Leptospirillum ferriphilum* strain Sp-Cl in the presence of a sulphur oxidising strain over a chloride ion concentration range of 0-30 g/l in culture media containing 3 g/l ferrous iron.

FIG. 9 further illustrates via shake flast tests the iron oxidation capability of the consortium used in this invention against an increased concentration of a mix of magnesium chloride, sodium chloride and aluminium chloride (0-30 g/l $Cl^{-1}$). The consortium demonstrated the capability of complete iron oxidation at up to 12 g/l in less than 11 days, with microbial activity observed up to 30 g/l $Cl^{-1}$ compared against the negative control.

Figure 10:
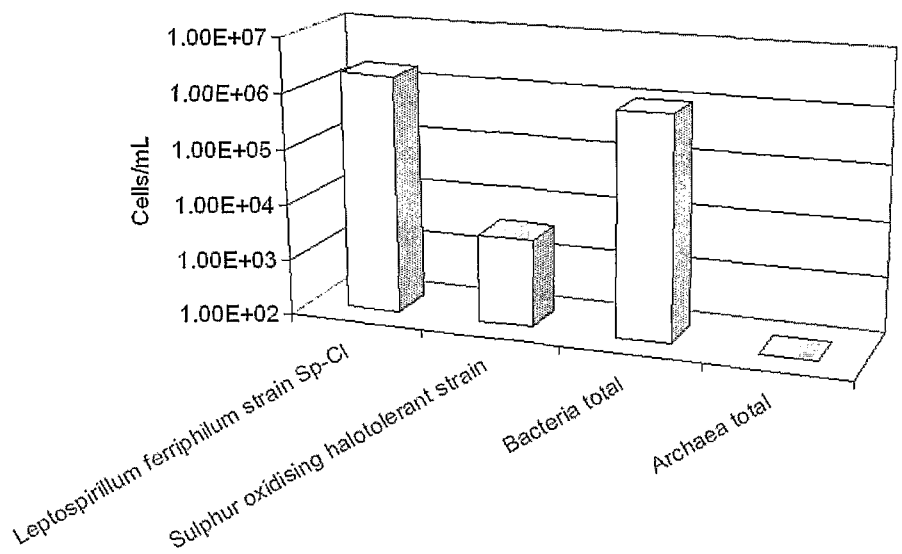
FIG. 10 illustrates results of a Real-Time PCR analysis performed on the 21 g/l Cl⁻ condition, shown in FIG. 9, after approximately 11 days of incubation.

FIG. 10 confirms the *Leptospirillum ferriphilum* strain Sp-Cl being the organism catalysing the iron oxidation at the high chloride concentrations evaluated in FIG. 9.

Figure 11:
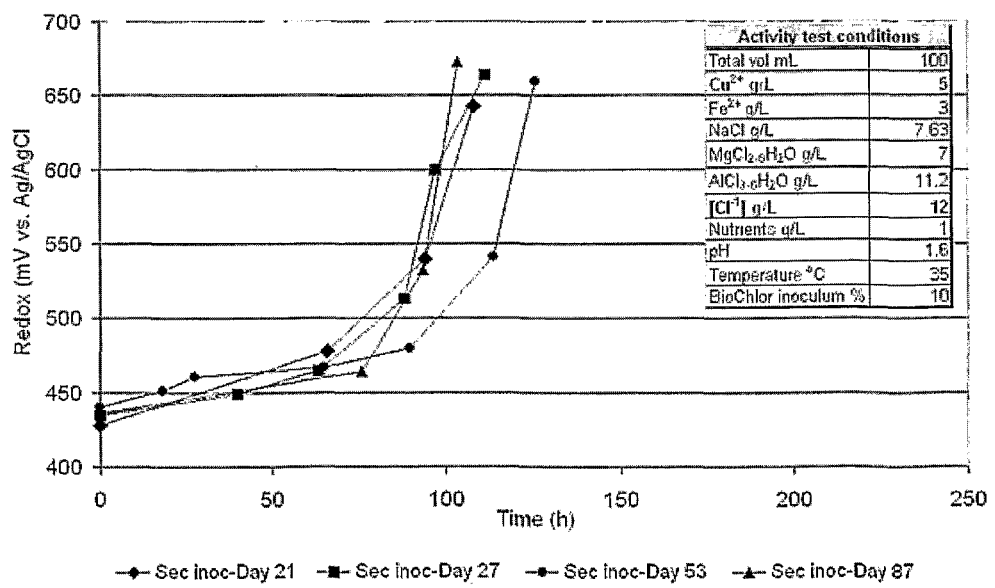
FIG. 11 demonstrates the iron oxidisation capability of the *Leptospirillum ferriphilum* strain Sp-Cl as a mixed culture in the presence of 5 g/l $Cu^{2+}$, 12 g/l $Cl^{-1}$ and 3 g/l $Fe^{2+}$.

FIG. 11 emphasises the chloride resistance of the consortium and the high copper tolerance in the presence of chloride, with remarkable iron oxidation rates obtained (less than 150 hours) at 12 g/l and 5 g/l $Cu^{2+}$. The samples for the iron oxidation shake flask tests were inoculated (10% inoculum to media) with culture from the secondary bioreactor shown in FIG. 5. The iron oxidation tests were performed over an operational period of the bioreactor system.

---

The invention claimed is:

1. A method of treating a sulphide mineral or mixed sulphide and oxide mineral comprising bioleaching the mineral in a chloride ion solution with a mixed culture consortium wherein:
   a) the chloride ion content is in the range of about 5,000 ppm to about 30,000 ppm;
   b) the chloride ion solution contains at least one of the following:
   aluminium, magnesium and sodium;
   c) the temperature of the solution is in excess of about 10° C.;
   d) the pH of the solution is in the range of about 1 to about 3; and
   e) the mixed culture consortium contains at least a salt tolerant strain of Leptospirillum ferriphilum which is strain Sp-Cl deposited at the DSMZ under the accession number DSM22399, and a sulphur oxidising microorganism which is halophilic or halotolerant, which consortium enhances the rate of ferrous iron oxidation.

2. A method according to claim 1 wherein the temperature is in the range of about 25° C. to about 45° C.

3. A method according to claim 1 wherein at least one microorganism in the consortium is cultured in at least one build-up reactor.

4. A method according to claim 1 wherein the mineral is inoculated with an inoculant which has a cell concentration of the consortium of between about $10^7$ cells/ml and about $10^9$ cells/ml to maintain a cell count in the mineral of from about $10^6$ to about $10^{11}$ cells per ton of ore.

5. A method according to claim 3 wherein an inoculum from the reactor is directed to a pond which is aerated and in which the inoculum is stored and maintained, and inoculum from the pond is added to the mineral.

6. A method according to claim 3 wherein inoculum from the reactor is added to crushed ore together with acid to form inoculated ore that is added to the mineral.

7. A method according to claim 1 wherein the consortium is produced in an inoculum generator and ore, to which microorganisms of the consortium is attached, is added to the mineral.

8. A method according to claim 1 wherein the sulphide mineral or the mixed sulphide and oxide mineral includes copper and wherein the method further comprises: extracting an intermediate leach solution from the mineral wherein the intermediate leach solution is not subjected to a metal recovery process, passing a pregnant leach solution draining from the mineral through a metal recovery process to define a raffinate and recirculating the intermediate leach solution and the raffinate to the mineral to increase the active cell count in the mineral.

9. A method according to claim 1 wherein sulphide mineral or the mixed sulphide and oxide mineral includes copper and wherein the microorganisms in the consortium have a tolerance to copper in excess of about 0.5 g/l.

10. A method according to claim 1 wherein at least one of the microorganisms included in the mixed culture consortium is adapted to increase tolerance of the consortium to chloride and to copper.

* * * * *

UNITED STATES PATENT AND TRADEMARK OFFICE
CERTIFICATE OF CORRECTION

PATENT NO.       : 8,597,933 B2
APPLICATION NO. : 13/000824
DATED            : December 3, 2013
INVENTOR(S)      : Rautenbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this
Twenty-second Day of September, 2015

Michelle K. Lee
*Director of the United States Patent and Trademark Office*